(12) United States Patent
Kikuchi (10) Patent No.: US 10,671,549 B2
(45) Date of Patent: Jun. 2, 2020

(54) MEMORY SYSTEM

(71) Applicant: TOSHIBA MEMORY CORPORATION, Tokyo (JP)

(72) Inventor: Takeshi Kikuchi, Isehara Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 112 days.

(21) Appl. No.: 15/063,156

(22) Filed: Mar. 7, 2016

(65) Prior Publication Data

US 2016/0283417 A1    Sep. 29, 2016

Related U.S. Application Data

(60) Provisional application No. 62/138,310, filed on Mar. 25, 2015.

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/1605* (2013.01); *G06F 13/4045* (2013.01); *G06F 13/4068* (2013.01); *G06F 13/4282* (2013.01)

(58) Field of Classification Search
CPC ............. G06F 13/1668; G06F 13/1605; G06F 13/4045; G06F 13/4068; G06F 13/4282
See application file for complete search history.

(56) References Cited

U.S. PATENT DOCUMENTS

| | | | |
|---|---|---|---|
| 7,913,037 B2 | 3/2011 | Nakajima et al. | |
| 7,958,295 B1* | 6/2011 | Liao | G06F 13/4045 710/244 |
| 8,732,380 B2 | 5/2014 | Jinno et al. | |
| 2006/0031612 A1* | 2/2006 | Bashford | G06F 13/385 710/74 |
| 2006/0041702 A1* | 2/2006 | Greenberger | G06F 3/061 710/306 |
| 2007/0070885 A1* | 3/2007 | Uddenberg | H04L 41/069 370/225 |
| 2011/0022736 A1* | 1/2011 | Uddenberg | G06F 13/4282 710/2 |
| 2011/0107129 A1* | 5/2011 | Sinykin | G06F 1/3228 713/322 |
| 2012/0151101 A1 | 6/2012 | Matsuo et al. | |
| 2014/0068177 A1* | 3/2014 | Raghavan | G06F 13/36 711/108 |

(Continued)

*Primary Examiner* — Tim T Vo
*Assistant Examiner* — Harry Z Wang
(74) *Attorney, Agent, or Firm* — Kim & Stewart LLP (57) ABSTRACT

A device includes a connector including first and second portions, each being configured to establish an independent data connection with a portion of first and second connectors in an external device, and a controller. When the first portion is connected with a third portion of the first external connector, and a request to connect with the second portion is received from the second external connector, the controller determines whether or not to accept the request, and transmit an acceptance signal or a rejection signal to the second external connector through the second portion, according to the determination result.

20 Claims, 7 Drawing Sheets

(56) References Cited

U.S. PATENT DOCUMENTS

| | | | |
|---|---|---|---|
| 2014/0136736 A1* | 5/2014 | Asano | G06F 13/28 |
| | | | 710/26 |
| 2014/0258572 A1* | 9/2014 | More | G06F 3/0689 |
| | | | 710/107 |
| 2014/0289452 A1* | 9/2014 | Matsuo | G06F 11/201 |
| | | | 711/103 |
| 2015/0095445 A1* | 4/2015 | Thankappan | H04L 45/125 |
| | | | 709/214 |

* cited by examiner

FIG. 1

| Command | Initiator | Number of transmittable frames |
|---|---|---|
| A | 11 | 10 |
| B | 11 | 20 |
| C | 12 | 5 |
| D | 11 | 30 |
| ⋮ | ⋮ | ⋮ |

FIG. 2

| Initiator | Address | Connection rate (Gbps) | Error flag |
|---|---|---|---|
| 11 | X | 1.5 | 0 |
| 12 | Y | 1.5 | 0 |
| ⋮ | ⋮ | ⋮ | ⋮ |

| Byte/Bit | 7 | 6 | 5 | 4 | 3 | 2 | 1 | 0 |
|---|---|---|---|---|---|---|---|---|
| 0 | Init | Protocol | | | Address frame type (1h) | | | |
| 1 | Features | | | | Connection rate | | | |
| 2 | Initiator connection tag | | | | | | | |
| 3 | | | | | | | | |
| 4 | Destination sas address | | | | | | | |
| ... | | | | | | | | |
| 11 | | | | | | | | |
| 12 | Source sas address | | | | | | | |
| ... | | | | | | | | |
| 19 | | | | | | | | |
| 20 | Source zone group | | | | | | | |
| 21 | Pathway blocked count | | | | | | | |
| 22 | Arbitration wait time (AWT) | | | | | | | |
| 23 | | | | | | | | |
| 24 | More compatible features (00000000h) | | | | | | | |
| ... | | | | | | | | |
| 27 | | | | | | | | |
| 28 | CRC | | | | | | | |
| ... | | | | | | | | |
| 31 | | | | | | | | |

MEMORY SYSTEM

CROSS-REFERENCE TO RELATED APPLICATION

This application is based upon and claims the benefit of priority from the U.S. Provisional Patent Application No. 62/138,310, filed Mar. 25, 2015, the entire contents of which are incorporated herein by reference.

FIELD

Embodiments described herein relate generally to a memory system using a serial attached SCSI (SAS) protocol.

BACKGROUND

SAS devices usually include one or more ports. A port usually includes one or more transfer paths (phys). A port including one phy is called a narrow port, and a port including two or more phys is called a wide port. A state where a plurality of phys inside a wide port is used as the same transfer path is called a wide link. With the wide link, a plurality of command frames can be transmitted/received concurrently between an initiator device (hereinafter referred to as initiator) and a target device (hereinafter referred to as target).

DETAILED DESCRIPTION

In general, according to an embodiment, a device comprises a connector including first and second portions, each being configured to establish an independent data connection with a portion of first and second connectors in an external device; and a controller. When the first portion is connected with a third portion of the first external connector, and a request to establish connection with the second portion is received from the second external connector, the controller determines whether or not to accept the request, and transmits an acceptance signal or a rejection signal to the second external connector through the second portion, according to the determination result.

Hereinafter, embodiments are described with reference to accompanying drawings.

Figure 1:
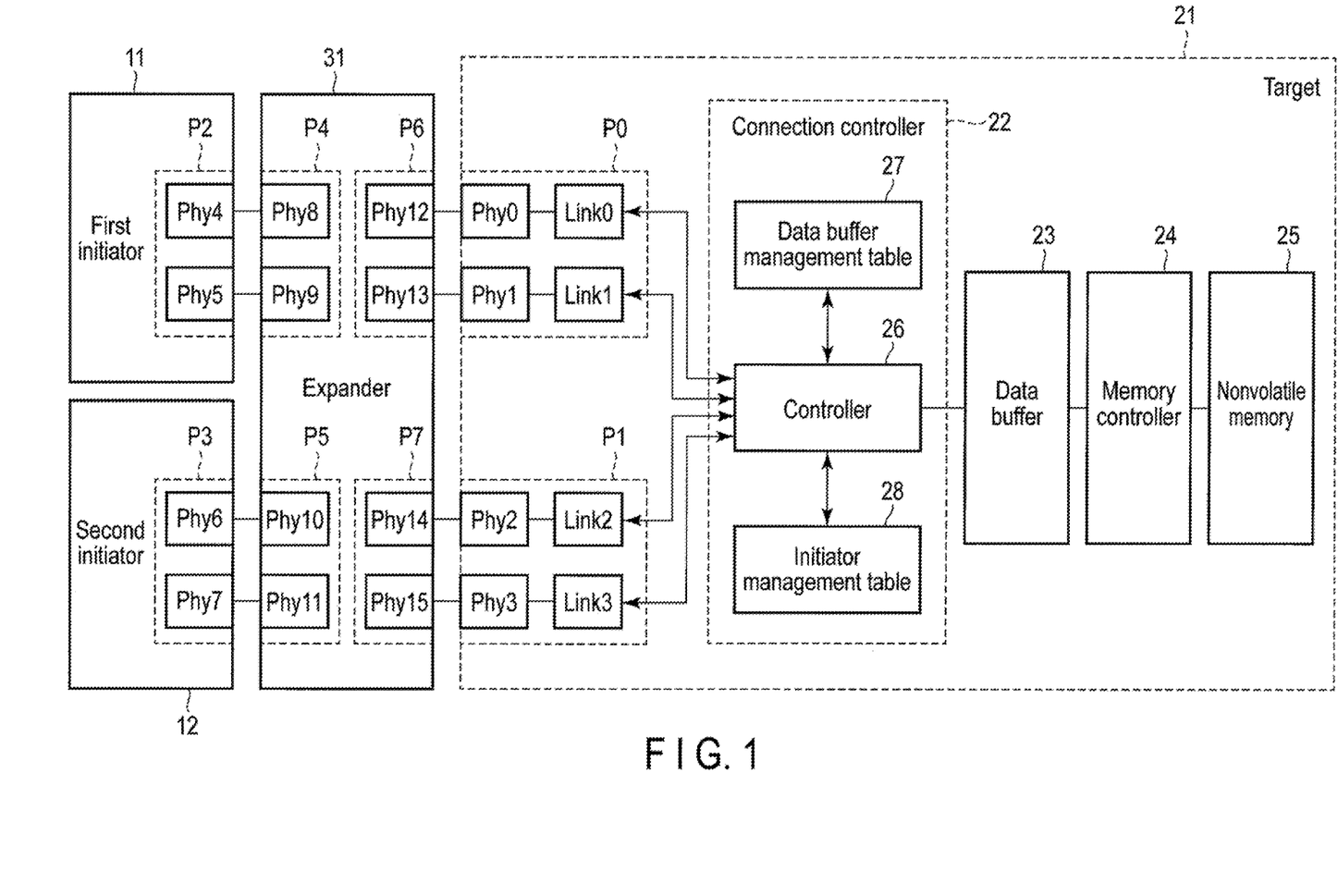
FIG. 1 shows a schematic structure of a memory system according to an embodiment.

FIG. 1 shows an SAS device applied to, for example, a server system or a storage system. The SAS device includes a first initiator 11 and a second initiator 12, which is, for example, a host, a target device (target) 21, which is, for example, a storage device, and an expander device (hereinafter referred to as expander) 31, which is, for example, a relay device which relays communications between the first and second initiators 11 and 12 and the target 21. The first and second initiators 11 and 12 issue a request to process a task to the target 21, and receive a response to the request from the target 21. The first and second initiators 11 and 12 include, for example, a server as the host.

The target 21 receives a request from the first and second initiators 11 and 12 and transmits a response to the first and second initiators 11 and 12. The target 21 includes, for example, a solid state drive (SSD), or a hard disk drive (HDD). FIG. 1 shows that one target 21 is connected to the expander 31; however, a plurality of targets may be connected to the expander 31. For example, a storage array can be structured when a plurality of SSDs or HDDs are connected to the expander 31. In that case, the first initiator 11 or the second initiator 12 may be an SAS controller for a redundant array of independent disks (RAID). In the present embodiment, the target 21 is structured as an SSD, for example.

The memory system may include the SSD, HDD, or storage array itself as the target 21, or may include the SSD, HDD, storage array, and initiators.

The first and second initiator 11 and 12 transmit, for example, commands and data to the target 21 and receive commands and data transmitted from the target 21. The target 21 receives, for example, the commands and data transmitted from the first and second initiators 11 and 12 and can transmit commands and data to the first and second initiators 11 and 12. The expander 31 is connected to the first and second initiators 11 and 12 and the target 21 through a physical link.

Each of the first initiator 11, second initiator 12, target 21, and expander 31 includes one or more ports (connectors). The target 21 includes, for example, port P0 and port P1. The first initiator 11 includes, for example, port P2. The second initiator 12 includes, for example, port P3. The expander 31 includes, for example, ports P4 to P7. Ports P0 to P7 are, as described below, a wide port, and include, for example, two or more portions, i.e., phy layers (hereinafter referred to as phys) used as transmitter/receiver units. To each phy, a link layer (hereinafter referred to as link), port layer, transport layer, application layer, etc. are connected. In FIG. 1, a link is shown to be connected only to port P0 and P1, and is not shown to be connected to the other ports P2 to P7. A unit corresponding to the port layer, transport layer, and application layer is shown in the target 21. A connection controller 22 inside the target 21, which is described below, is included in, for example, the port layer. A data buffer 23, memory controller 24, and nonvolatile memory 25 are included in, for example, the transport layer, and the application layer. However, a relationship between the connection controller 22, data buffer 23, memory controller 24, and nonvolatile memory 25, and the port layer, transport layer, and application layer is not limited thereto and can be varied.

The phy as a transmitter/receiver of signals defines 8b10b coding and out of band (OOB), and executes an interface between the physical link and the link, which is described below.

FIG. 1 shows that port P0 includes phy 0, phy 1, link 0, and link 1, and port P1 includes phy 2, phy 3, link 2, and link 3. Each phy includes a transmitter and a receiver of differential signals, which are not shown, and can perform interactive communication concurrently. In the present embodiment, the transmitter and the receiver of the phy are omitted for the sake of simplification.

Links 0 to 3 are the interfaces between phys 0 to 3 and the connection controller 22 and operate as a port layer, and send an address frame and a connection condition supplied from phys 0 to 3 to the connection controller 22.

In FIG. 1, phys 4 to 7 included in ports P2 and P3 of the first and second initiators 11 and 12 are connected to phys 8 to 11 of ports P4 and P5 of the expander 31, respectively. Phys 0 and 1 included in port P0 of the target 21 are connected to phys 12 and 13 included in port P6 of the expander 31, respectively. Phys 2 and 3 included in port P1 are connected to phys 14 and 15 included in port P7 of the expander 31, respectively.

Based on an SAS address included in commands received by one of its phys, the expander 31 transmits the commands to phys of the other ports in the expander 31. For example, when phy 12 included in port P6 receives the commands transmitted from phy 0 of port P0, based on an SAS address included in the commands, the commands can be transmitted to, for example, phy 8 included in port P4, or phy 10 included in port P5.

(Wide Link)

Furthermore, a plurality of phys inside a port (wide port) can be used as the same transfer path. Such a condition of use is referred to as the wide link. For example, a pair of phy 0 and phy 1 included in port P0 of the target device 21 is handled as the same transfer path. Specifically, phy 0 and phy 1 included in port P0 of the target device 21 can be connected to phy 4 and phy 5 included in port P2 of an initiator device 11, respectively, through the expander 31. With this wide link, transmission of a frame of command A from phy 0 to phy 4 can be performed concurrently with transmission of a frame of command B from phy 1 to phy 5, for example. Therefore, throughput with respect to the initiator device 11 can be improved.

The target 21 includes the connection controller 22, data buffer 23, memory controller 24, and nonvolatile memory 25, as described above. The connection controller 22 controls a connection between ports P0 and P1 and the first and second initiators 11 and 12.

The data buffer 23 is, for example, a volatile memory which temporarily stores data read from the nonvolatile memory 25 and sent to the first and second initiators 11 and 12.

The memory controller 24 controls write and read operations with respect to the nonvolatile memory 25.

The nonvolatile memory 25 is, for example, a NAND flash memory. However, it is not limited to a NAND flash memory.

The connection controller 22 includes a controller 26, a data buffer management table 27, and an initiator management table 28. The connection controller 22 is, for example, hardware; however, it is not limited thereto and may be firmware and software which can perform rapid operations.

Figure 2:
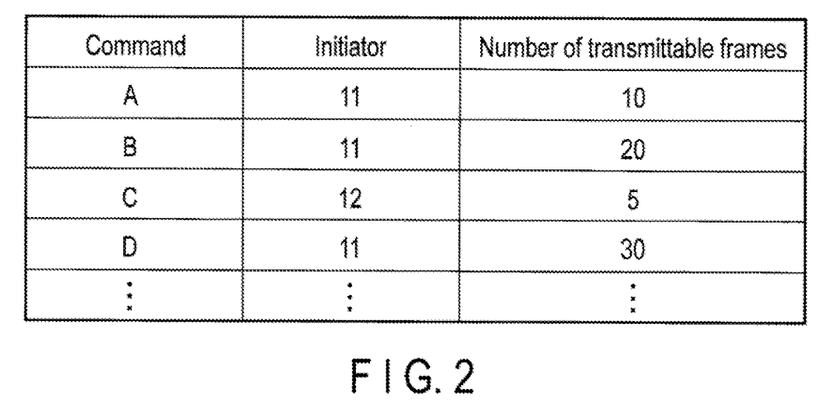
FIG. 2 shows an example of a data buffer management table shown in FIG. 1.

FIG. 2 shows an example of the data buffer management table 27. The data buffer management table 27 is used to manage amount of data that are stored in the data buffer 23 and can be transmitted to the first and second initiators 11 and 12. That is, the data buffer management table 27 is used to manage, for example, the number of frames that can be transmitted in response to each command transmitted from the first and second initiators 11 and 12 to the target 21.

Figure 3:
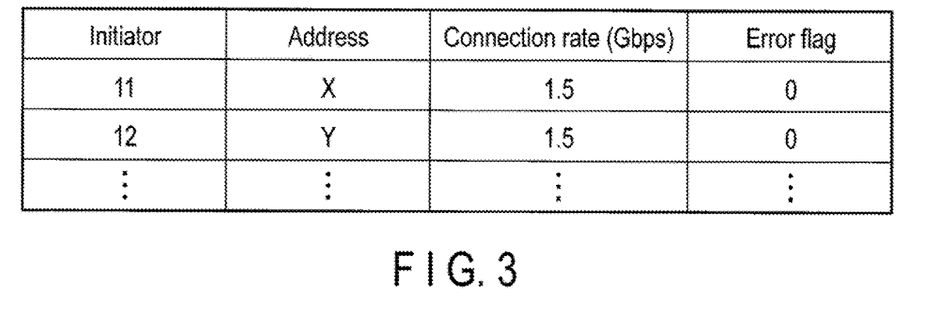
FIG. 3 shows an example of an initiator management table shown in FIG. 1.

FIG. 3 shows an example of the initiator management table 28. The initiator management table 28 is used to manage SAS address, connection rate, and error flag of each initiator. The connection rate indicates an effective speed of the transfer path between the phy of the initiator and the phy of the target established based on a connection request. Each phy supports, for example, 1.5 Gbps. The error flag indicates whether or not an error such as queue full or tag overlap occurs in the initiator. Queue full indicates whether or not the number of commands exceeds the number of commands that may be issued by the initiator, and if it exceeds, it is an error. Tag overlap indicates whether or not tags applied to the commands issued from the initiator overlap with each other, and if they overlap, it is an error. If there is any one of these errors, the error flag is set to 1, and if there is no error, the error flag is set to 0.

The controller 26 refers to the buffer management table 27 and the initiator management table 28 based on the connection data supplied from the link and controls a connection between ports P0 and P1 of the target 21 and ports P2 and P3 of the first and second initiators 11 and 12.

(OPEN Sequence)

Generally, when data communication is performed between an initiator and a target of SAS, an OPEN sequence needs to be executed, and the initiator and the target are required to be in a CONNECTED state.

Figure 4:
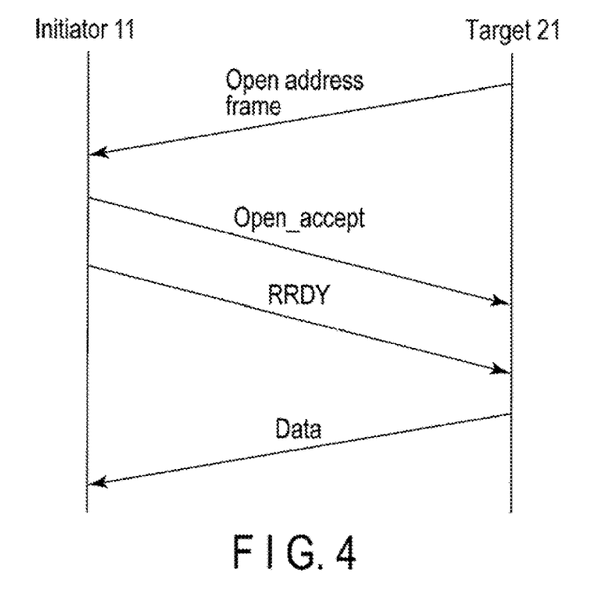
FIG. 4 is a sequence diagram which shows an example of general OPEN sequence.

FIG. 4 shows an example of general OPEN sequence. The OPEN sequence is initiated by transmitting an OPEN address frame as a connection request from a data transmission source.

Figure 5:
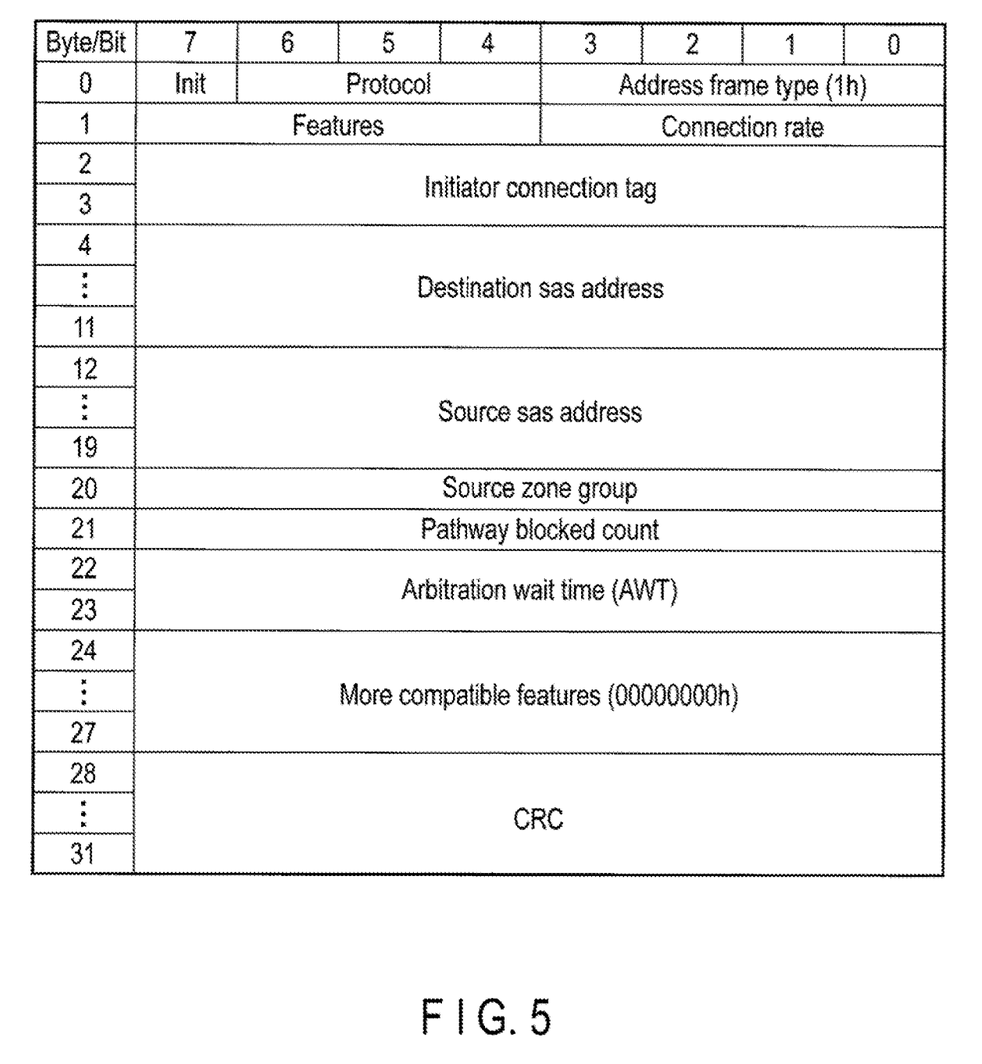
FIG. 5 shows contents of an OPEN address frame.

FIG. 5 shows an example of the OPEN address frame. The OPEN address frame includes a destination SAS address and a source SAS address. The OPEN address frame can be issued from either the initiator or the target. FIG. 4 shows an example of the OPEN sequence when the data are transmitted from the target 21 to the first initiator 11.

Based on the OPEN address frame, the first initiator 11 determines whether to accept the connection request. In the example shown in FIG. 4, the first initiator 11 transmits OPEN_ACCEPT indicative of acceptance. If the target 21 receives OPEN_ACCEPT from the first initiator 11, the target 21 and the first initiator 11 become connected (enter into the connected state). Furthermore, if RRDY is transmitted from the first initiator 11 and received by the target 21, data transmission between the target 21 and the first initiator 11 can be performed.

The connection request is issued by either the target 21 or the first initiator 11. That is, both the target 21 and the first initiator 11 can be a transmission source of the connection request. Thus, if phy 6 of the second initiator 12 issues a connection request to phy 1 of the target 21 while phy 0 of the target 21 and phy 4 of the first initiator 11 are in the CONNECTED state, phy 1 of the target 21 and phy 6 of the second initiator 12 can be in the CONNECTED state. If phy 0 of the target 21 and phy 4 of the first initiator 11 are in the CONNECTED state and phy 1 and phy 6 of the second initiator 12 are in the CONNECTED state, phys 0 and 1 of the target 21 cannot form a wide link. In that case, even if the data buffer includes plenty of data to be transmitted from the target 21 to the first initiator 11, rapid data transmission to the first initiator 11 cannot be performed. Consequently, throughput with respect to the first initiator 11 may be decreased.

(Operation of Present Embodiment)

The operation of the present embodiment is described with reference to FIGS. 6 to 10.

Figure 6:
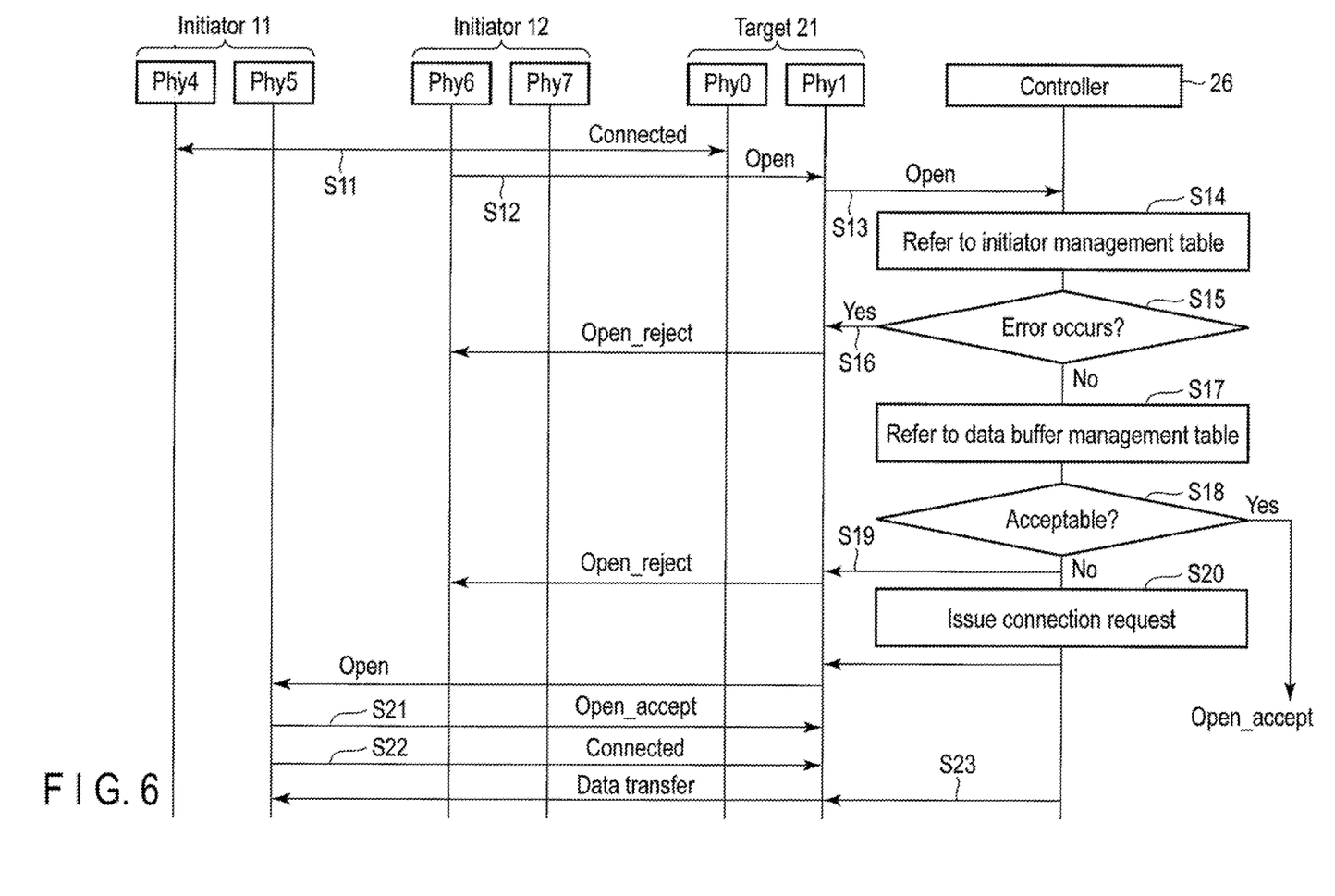
FIG. 6 is a sequence diagram which shows an example of an operation carried out by a memory system according to the embodiment.
Figure 7:
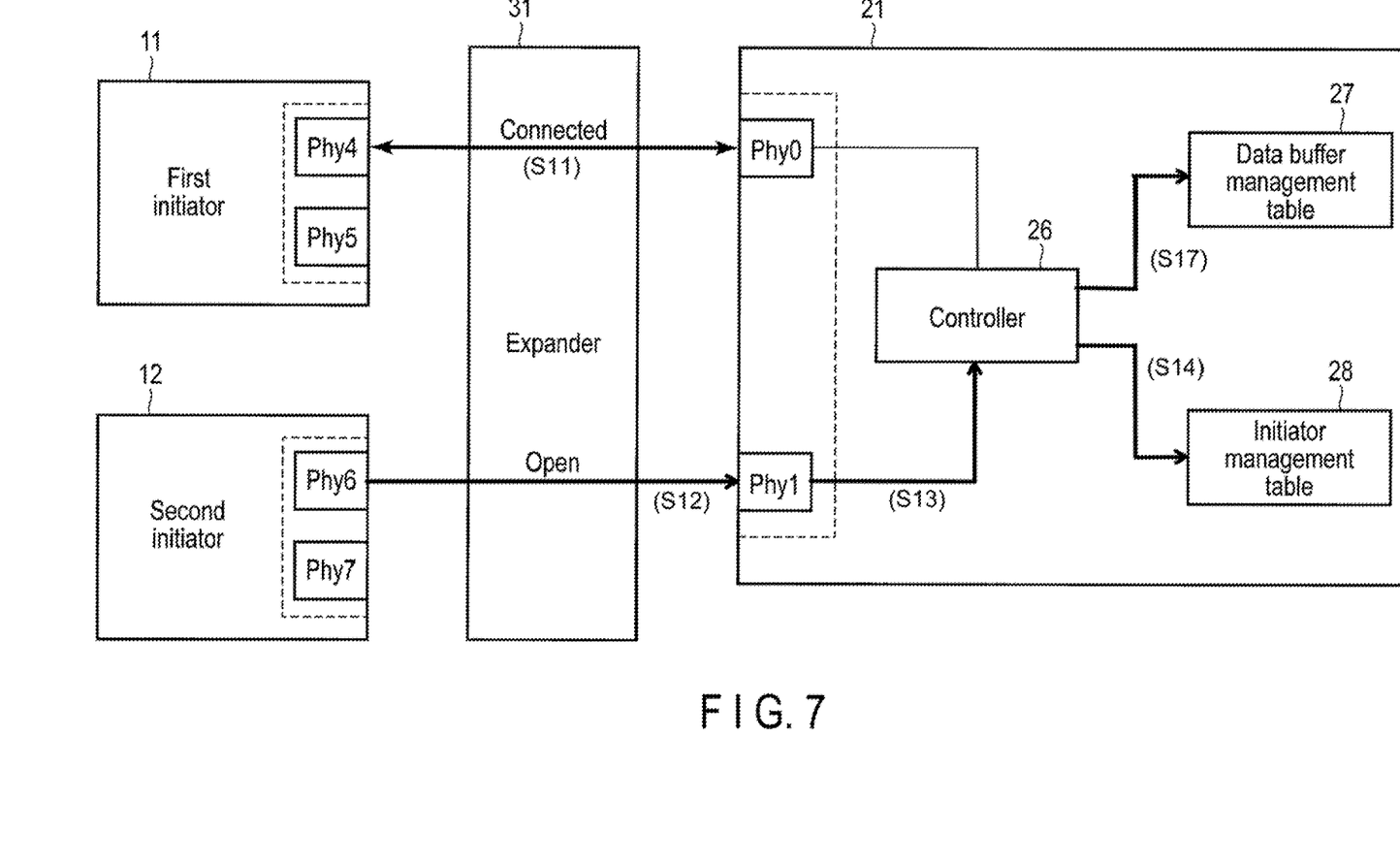
FIGS. 7-9 each schematically illustrate steps of the operation carried out by the memory system according to the embodiment.

In the example shown in FIGS. 6 and 7, it is assumed that phy 4 of the first initiator 11 and phy 0 of the target 21 are in the CONNECTED state (S11). In this state, If an OPEN address frame is issued from, for example, phy 6 of the second initiator 12 to phy 1 of the target 21 as a connection request (S12), an OPEN address frame and the like are transmitted from link 1 connected to phy 1 to the controller 26 (S13).

The controller 26 refers to the initiator management table 28 based on, for example, a source SAS address included in the OPEN address frame (S14), and determines whether or not the initiator having the source SAS address has an error (S15). If a determination result indicates an error, the controller 26 instructs phy 1 to reject the connection request through link 1, and phy 1 transmits OPEN_REJECT to phy 6 of the second initiator 12 (S16) (FIG. 8).

On the other hand, if the determination result of S15 indicates no error, the controller 26 refers to the data buffer management table 27 (S17), and determines whether or not the connection request from the second initiator 12 is acceptable (S18). Specifically, the total number of frames transmittable to the first initiator 11 is compared to the total number of frames transmittable to the second initiator 12, which are retained in the data buffer management table 27 shown in FIG. 2. In the data buffer management table 27 shown in FIG. 2, the total number of frames transmittable to the second initiator 12, which is the transmission source of the connection request, is less than the total number of frames transmittable to the first initiator 11. In that case, the controller 22 determines that the connection request of the second initiator 12 is unacceptable.

Figure 8:
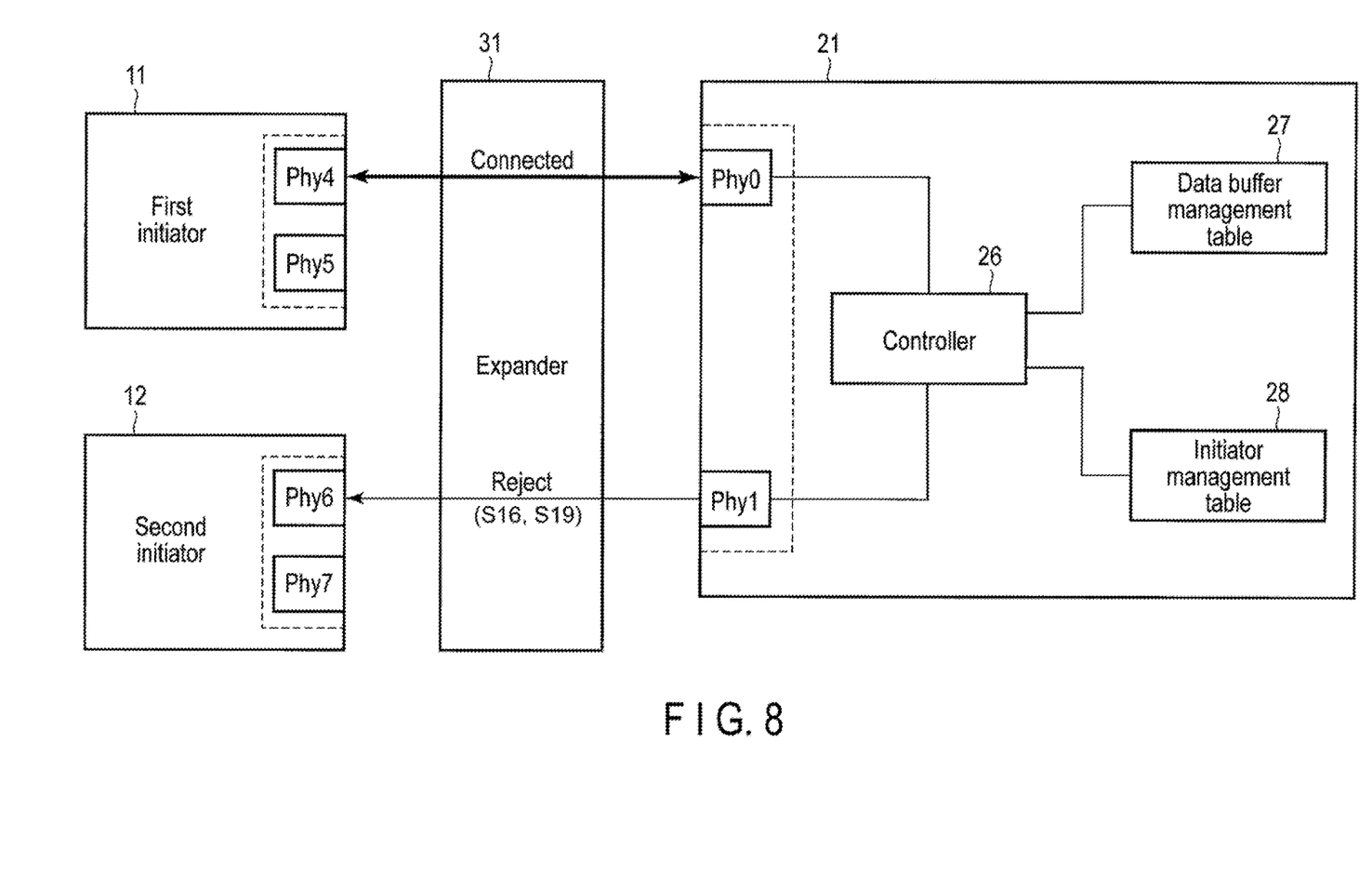

Then, the controller 26 instructs the rejection of the connection request to phy 1 through link 1, and the phy 1 of the target 21 transmits OPEN_REJECT which rejects the connection request to phy 6 of the second initiator 12 (S19) (FIG. 8). In contrast, if the determination result of S18 indicates that the connection request is acceptable, the controller 26 instructs issuance of OPEN_ACCEPT.

Figure 9:
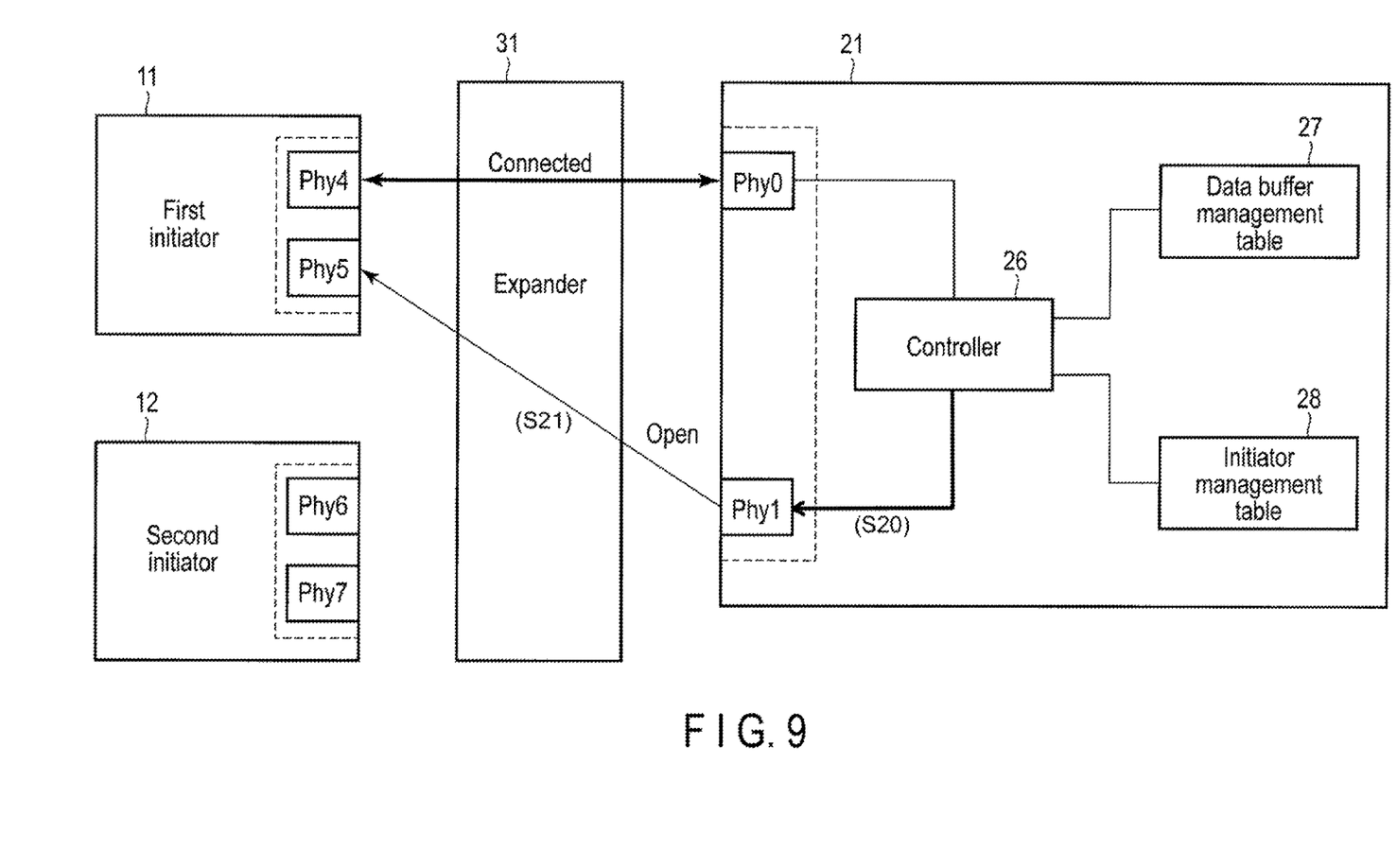

Then, since the total number of frames transmittable to the first initiator 11 is greater than the total number of frames transmittable to the second initiator 12, the connection between phy 1 of the target 21 and phy 5 of the first initiator 11 can establish a wide link. To form the wide link, the controller 26 instructs issuance of the connection request (OPEN address frame) from phy 1 of the target 12 to phy 5 of the first initiator 11 (S20) (FIG. 9).

Then, the phy 5 of the first initiator 11 transmits OPEN_ACCEPT indicative of acceptance of the connection request to phy 1 of the target 21 (S21) (FIG. 9), and phy 1 of the target 21 and phy 5 of the first initiator 11 are set to the CONNECTED state (S22).

Thereafter, phy 5 of the first initiator 11 transmits RRDY which is not shown to phy 1 of the target 21, the data in the data buffer 23 are transmitted from phy1 of the target 21 to phy 5 of the first initiator 11 (S23). That is, the data are transmitted from port P0 of the target 21 to port P2 of the first initiator 11 by the wide link.

The above description is presented given that data transmission is performed using port P2 of the first initiator 11 and port P0 of the target 21 as the wide link. However, no limitation is intended thereby, and the same operation can be performed even if port P3 of the second initiator 12 and port P1 of the target 21 are used as a wide link.

According to the above embodiment, while phy 4 of port P2 of the first initiator 11 and phy 0 of port P0 of the target 21 are in a CONNECTED state, if a connection request is issued to phy 1 of port P0 of the target 21 from phy 6 of the second initiator 12 other than phy 5 of port P2 of the first initiator 11, whether or not ports P0 and P2 should be a wide link is determined with reference to the data buffer management table 27. That is, whether or not the number of frames transmittable to the first initiator 11 in which phy 4 is in a CONNECTED state is greater than the number of frames transmittable to the second initiator is determined. If the determination result indicates that the number of frames transmittable to the first initiator 11 is greater than the number of frames transmittable to the second initiator, OPEN_REJECT is transmitted in response to the connection request issued by phy 6 of the second initiator 12 to establish a wide link, and the connection request is issued from phy 1 of port P0 to phy 6 of port P2 to be a wide link. Therefore, rapid data transmission with respect to the first initiator 11 can be performed, and throughput can be improved.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
    a nonvolatile memory;
    a data buffer configured to store data read from the nonvolatile memory;
    a communication port including first and second portions that form a wide port based on a Serial Attached SCSI (SAS) protocol, each of the first and second portions being configured to establish an independent data connection with an external device; and
    a memory device controller configured to determine a first total number of data frames to be transmitted from the data buffer through the communication port to a first external communication port and a second total number of data frames to be transmitted from the data buffer through the communication port to a second external communication port, wherein
    when a request to establish connection with the second portion is received from the second external communication port while the first portion is connected with a third portion of the first external communication port and the second portion is available for a data connection with any external device, and the first total number is greater than the second total number, the memory device controller transmits a rejection signal in response to the request to establish connection to the second external communication port through the second portion.

2. The memory device according to claim 1, wherein the memory device controller is configured to transmit a request to establish connection with a second portion of the first external communication port after transmitting the rejection signal, so that a wide data connection between the communication port and the first external communication port can be established.

3. The memory device according to claim 1, wherein the first external communication port is included in a first external device, and
    the second communication port connector is included in a second external device.

4. The memory device according to claim 3, further comprising:
    a storage storing a table having an entry for each command received from the first and second external devices, each entry including an ID of the external device that originated the command and a number of data frames to be transmitted and associated with the command, wherein the memory device controller determines the first and second total numbers based on the table.

5. The memory device according to claim 3, further comprising:

a storage storing a table having an entry for each external device, each entry including an ID of the external device and an error flag associated with the external device, wherein when a request to establish connection with the second portion is received from the first external device, the memory device controller rejects the request when the error flag is set for the external device.

6. The memory device according to claim 1, further comprising:

a nonvolatile memory configured to store data received from the external device.

7. The memory device according to claim 6, further comprising:

a volatile memory configured to temporarily store data to be written to or data read from the nonvolatile memory.

8. The memory device according to claim 1, wherein the external device is a host.

9. An information processing system, comprising:

a first host device including a first communication port including first and second portions;

a second host device including a second communication port including third and fourth portions; and a memory device including:
 a nonvolatile memory;
 a data buffer configured to store data read from the nonvolatile memory;
 a third communication port including fifth and sixth portions that form a wide port based on a Serial Attached SCSI (SAS) protocol, each of the fifth and sixth portions being configured to establish an independent data connection with one of the first, second, third, and fourth portions; and
 a memory device controller configured to determine a first total number of data frames to be transmitted from the data buffer through the third communication port to the first communication port and a second total number of data frames to be transmitted from the data buffer through the third communication port to the second communication port, wherein when a request to connect with the sixth portion is received from the second host device while the fifth portion is connected with the first portion and the sixth portion is available for a data connection with any host device, and the first total number is greater than the second total number, the memory device controller transmits a rejection signal in response to the request to connect with the sixth portion to the second host device through the sixth portion.

10. The system according to claim 9, wherein the memory device controller is configured to transmit a second request to establish connection with the second portion after transmitting the rejection signal, so that a wide data connection between the first and third communication ports can be established.

11. The system according to claim 9, wherein the memory device further includes a storage storing a table having an entry for each command received from the first and second host devices, each entry including an ID of the host device that originated the command and a number of transmittable frames associated with the command, and the memory device controller determines the first and second total numbers based on the table.

12. The system according to claim 9, wherein the memory device further includes a storage storing a table having an entry for each of the first and second host devices, each entry including an ID of the host device and an error flag with respect thereto, and when a request to establish connection with the sixth portion is received from the first host device, the memory device controller rejects the request when the error flag is set for the first host device.

13. The system according to claim 9, further comprising:

an expander connected to the first and second host devices, and the memory device, and configured to mediate data connection between the first host device and the memory device, and between the second host device and the memory device.

14. A memory device capable of communicating with a host using a Serial Attached SCSI (SAS) interface, comprising:

a nonvolatile memory;

a buffer configured to store data read from the nonvolatile memory; and a memory device controller circuit including an SAS wide port, the SAS wide port including a first phy and a second phy, wherein in a case where (a) first data of a first size is read from the nonvolatile memory and stored in the buffer, wherein the first data is data to be transmitted to a first host, and second data of a second size smaller than the first size is read from the nonvolatile memory and stored in the buffer, wherein the second data is data to be transmitted to a second host, and (b) the first phy is connected with the first host and the second phy is available for a data connection with any host and receives a connection request signal from the second host, the memory device controller circuit transmits a connection reject signal in response to the connection request signal to the second host through the second phy.

15. The memory device according to claim 14, wherein the memory device controller circuit is further configured to:

transmit a connection request signal to the first host through the second phy after transmitting the connection reject signal.

16. The memory device according to claim 14, wherein the memory device controller circuit further includes a buffer management table including a plurality of entries, each of the plurality of entries including an identifier of a command, an identifier of a host that originated the command, and a size of data to be transmitted to the host based on the command, and the memory device controller circuit is further configured to transmit the connection reject signal by referring to the buffer management table.

17. The memory device according to claim 14, wherein in a case where (c) identifiers of two of a plurality of queued commands received from the first host are equal, and (d) the second phy receives a connection request signal from the first host, the memory device controller circuit transmits a connection reject signal to the first host through the second phy.

18. The memory device according to claim 17, wherein the memory device controller circuit further includes a host management table including a plurality of entries, each of the plurality of entries including an identifier of a host and an error flag related to the host, and the memory device controller circuit is further configured to transmit the connection reject signal by referring to the host management table.

19. The memory device according to claim 14, wherein in a case where (c) a number queued commands received from the first host is larger than an upper limit, and (d) the second phy receives a connection request signal from the first host, the memory device controller circuit transmits a connection reject signal to the first host through the second phy.

20. The memory device according to claim 19, wherein, the memory device controller circuit further includes a host management table including a plurality of entries, each of the plurality of entries including an identifier of a host and an error flag related to the host, and the memory device controller circuit is further configured to transmit the connection reject signal by referring to the host management table.

* * * * *